(12) United States Patent
Bromberger et al.

(10) Patent No.: US 6,582,155 B1
(45) Date of Patent: Jun. 24, 2003

(54) SOIL PACKING DEVICE WITH A VIBRATION ISOLATING MOUNTING FOR A STARTER BATTERY

(75) Inventors: Thomas Bromberger, Train (DE); Thomas Maurer, Munich (DE); Norbert Jungwirth, Unterschleissheim (DE); Klaus Blaffert, Munich (DE)

(73) Assignee: Wacker Construction Equipment AG, Munich (DE)

( * ) Notice: Subject to any disclaimer, the term of this patent is extended or adjusted under 35 U.S.C. 154(b) by 0 days.

(21) Appl. No.: 10/009,578
(22) PCT Filed: Jul. 27, 1999
(86) PCT No.: PCT/EP99/05389
§ 371 (c)(1), (2), (4) Date: Oct. 22, 2001
(87) PCT Pub. No.: WO01/07293
PCT Pub. Date: Feb. 1, 2001

(51) Int. Cl.$^7$ ................................................. B60R 11/00
(52) U.S. Cl. ...................... 404/133.05; 429/96; 429/186
(58) Field of Search ...................... 404/133.05, 133.1, 404/133.2, 90, 122; 429/163, 164, 176, 186, 96–100

(56) References Cited

U.S. PATENT DOCUMENTS

| | | | | |
|---|---|---|---|---|
| 4,187,036 A | * | 2/1980 | Haker et al. | 404/117 |
| 4,429,025 A | * | 1/1984 | Stow | 429/97 |
| 4,469,765 A | * | 9/1984 | McCartney et al. | 429/123 |

FOREIGN PATENT DOCUMENTS

| | | |
|---|---|---|
| DE | 4340007 | 6/1994 |
| DE | 19540927 | 5/1997 |
| DE | 29804047 | 6/1998 |
| JP | 02197446 | 8/1990 |
| JP | 03200451 | 9/1991 |
| JP | 10016689 | 1/1998 |

* cited by examiner

Primary Examiner—Thomas B. Will
Assistant Examiner—Alexandra K. Pechhold
(74) Attorney, Agent, or Firm—Boyle Fredrickson Newholm Stein & Gratz S.C.

(57) ABSTRACT

A soil compaction device has a receptacle in which a cage can be placed to hold a battery. At the external side of the cage there are spring-damper elements provided that keep the excessively strong acceleration loads away from the battery. The cage and the battery can be pulled out of the receptacle in a simple manner in one piece.

10 Claims, 3 Drawing Sheets

SOIL PACKING DEVICE WITH A VIBRATION ISOLATING MOUNTING FOR A STARTER BATTERY

BACKGROUND OF THE INVENTION

1. Field of the Invention

This invention pertains to a soil compaction device with a support for a starter battery.

2. Description of the Related Art

These types of soil compaction devices, such as vibration plates known from DE-U-298 04 047 as well as vibration tampers or vibration rolls are commonly driven using an internal combustion engine that is started using an electric starter fed from a starter battery. These batteries are mainly grid plate accumulators that are designed for loads encountered in the operation of automobiles in street traffic. In the operation of a soil compaction device, however, very high acceleration loads arise that are transmitted to the battery depending on the type of receptacle for the battery in the device, so that the grid structure of the batteries can experience damage quickly. For this reason, special vibration-free batteries were developed, which, however, are very expensive. On the other hand, it is possible to store the batteries softly in the receptacle on so-called damping pillows, which are plates made of elastic material. However, even in this case, unacceptably high acceleration loads are conveyed onto the batteries. In addition, it takes a lot of work to fasten the damping pillows in the receptacle.

Similar problems exist in other oscillatory equipment such as for blade smoothers to smooth out concrete, joint cutters or generators.

DE 195 40 927 A1 illustrates a counteracting oscillator for an automobile in which a vehicle battery serving as the counteracting mass is held in a cage that is supported by elastic support elements on the walls of the vehicle. The battery produces a counter-oscillation due to its inertia, and this is superimposed onto the vehicle oscillation, thus tempering the vehicle oscillations.

A similar design is known from DE 43 40 007 A1. In sustained operation, vehicle oscillations are considerably weaker than the oscillations that occur in soil compaction devices carrying a heavy oscillator.

Another counteracting oscillator arrangement for automobiles is known from JP-A-02197446 in which the mass of a starter battery is used as a damping mass to temper vehicle oscillations.

JP-A-10016689 discloses an oscillation-insulating carriage for a starter battery that can be inserted into a closed box that in turn sits on springs to dampen weak impacts. In order to prevent the destruction of the battery in case of a vehicle collision, an airbag is located in the main direction of motion of the vehicle separated from the box. This airbag is inflated in an accident and cushions the battery and the box.

SUMMARY OF THE INVENTION

This invention seeks to provide a soil compaction device in which excessively strong effects of acceleration loads on the starter battery is prevented without requiring a large amount of design work.

The solution of the objective is given in the features of patent claim 1. Advantageous embodiment forms of the invention are found in the subordinate claims.

According to the invention, an oscillatory piece of equipment, in particular a soil compaction device, is provided with a receptacle provided at an upper side of the soil compaction device, a cage to hold a battery that can be placed in the receptacle, a gap designed between at least one external side of the cages and at least one internal side of the receptacle and at least one spring-damper element located inside the gap that is not fastened to the receptacle.

The advantage to this is that the battery can then be very easily pulled out of or inserted into the receptacle together with the cage that serves as a box. No additional locking means is required. It is preferred that the spring-damper elements are fastened to the cage here. However, they can also be placed loosely into the gap between the cage and the receptacle.

It is advantageous if a number of spring-damper elements are fastened to at least one external side of the cage. This makes it possible to prepare the cage with the battery contained in it outside the receptacle and to equip it with the spring-damper elements suited for the respective equipment. Then, the cage can be placed into the receptacle.

Since the spring-damper elements do not have to be fastened to the receptacle, the receptacle permanently connected to the equipment can be designed by means of a simple recess needing no further design measures.

The oscillatory damping function is assumed exclusively by the cage and the spring-damper elements fastened to it so that the battery placed into the cage is protected against high acceleration loads.

An advantageous embodiment form of the invention is characterized in that the external sides of the cage enclose at least one floor plate and a number of side walls, to which at least one spring-damper element is fastened, respectively. This makes it possible to take up oscillations that are exerted by the receptacle onto the cage from nearly all spatial directions.

It is advantageous if the spring-damper elements are made of an elastic rubber material. They can be designed in any manner suitable to produce the desired spring and damping characteristics. Moreover, the spring-damper elements can be exchanged at the cage so that the cage can be adjusted for other uses. The design of the spring-damper elements should be done, in particular, so that the characteristic frequency of the cage in the receptacle is smaller than the exciting frequency. In the process, excessive oscillation amplitudes by the battery must be prevented by selecting the right damping in the spring-damper elements and by appropriately attaching the spring-damper elements.

A very advantageous embodiment form of the invention is characterized in that the cage is made of two separated halves, between which the battery can be placed. This allows the same cage to be adjusted to batteries with different sizes since common starter batteries vary in design length for the most part depending on their capacity, whereas their height and width remain constant. The halves of the cage can thus be used in different equipment with different starter battery lengths without having to modify the cage halves themselves.

For improved handling ability, it is very useful if the cage halves or the cage have carrying grips.

BRIEF DESCRIPTION OF THE DRAWINGS

This and other features and advantages of the invention are described in more detail below with the help of the accompanying figures representing a preferred embodiment example. Shown are.

DETAILED DESCRIPTION OF THE PREFERRED EMBODIMENTS

Figure 1:
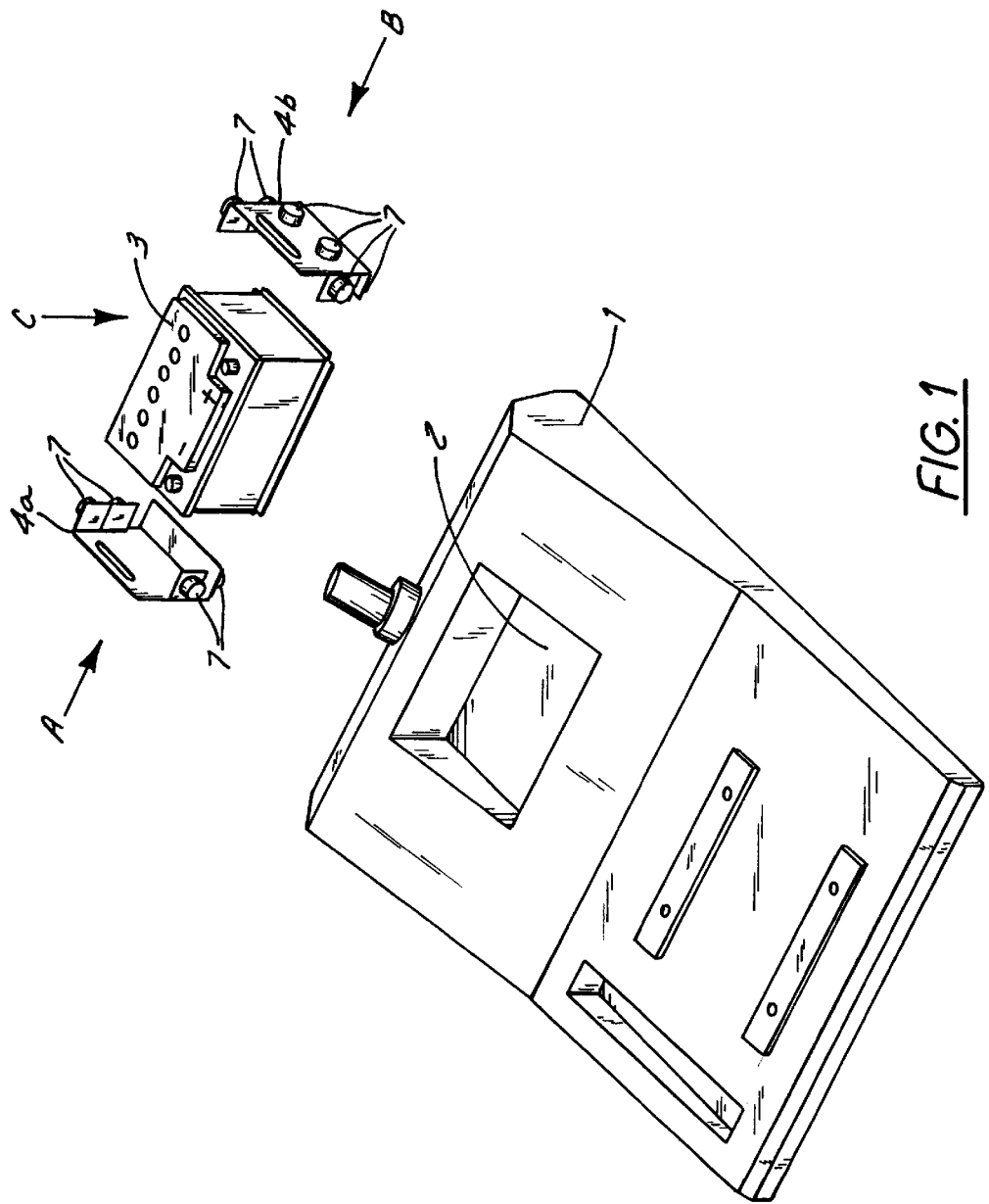
FIG. 1 a part of a piece of equipment according to the invention with a cage made of two cage halves and a battery in an exploded view.
Figure 2:
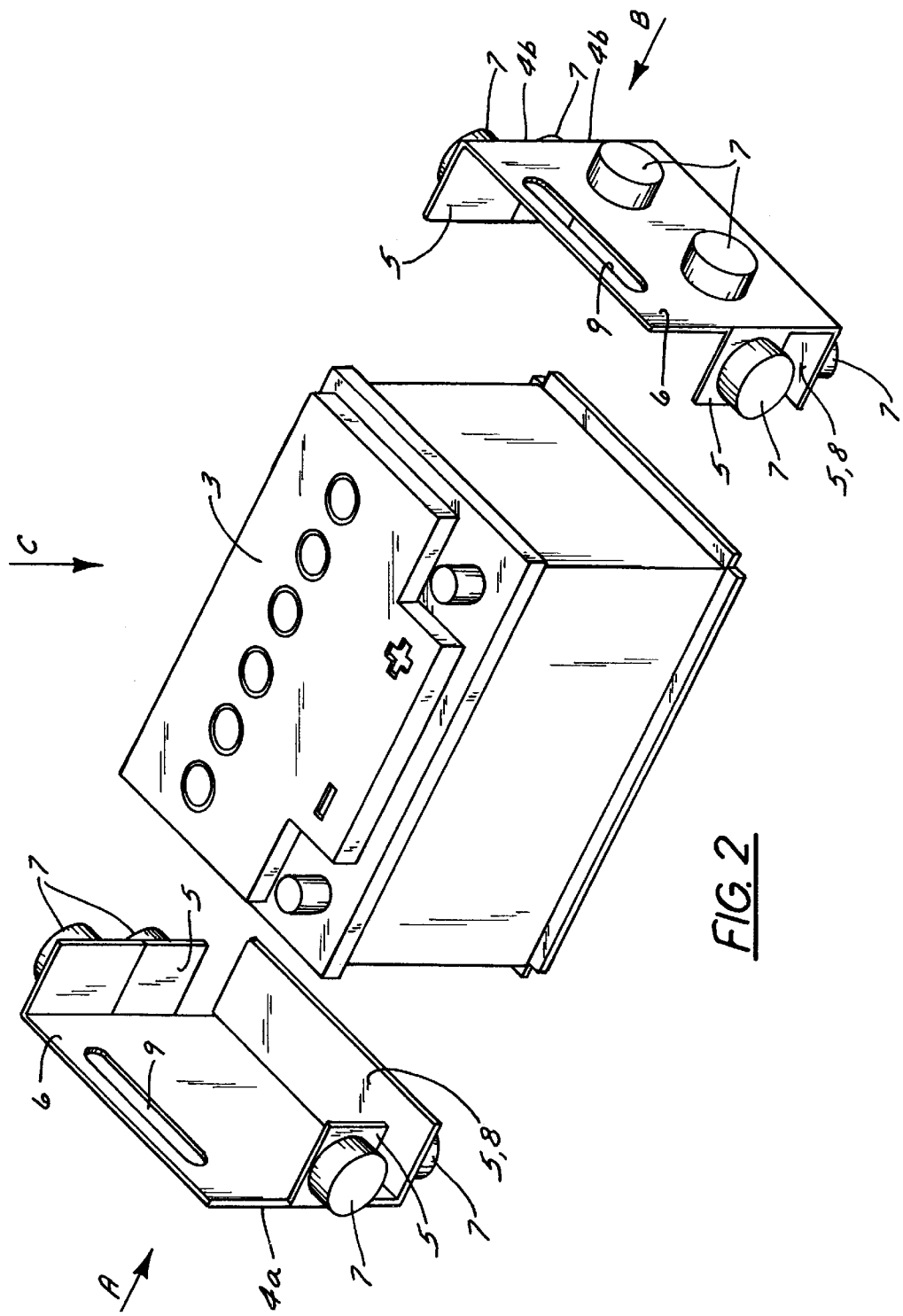
FIG. 2 an enlarged explosion view of the cage and the battery.

Since FIG. 2 shows essentially only a sectional enlargement of FIG. 1, FIGS. 1 and 2 will be explained below together, using the same reference numbers.

On the top of a vibration plate 1 serving as an oscillatory piece of equipment or a soil compaction device, only the upper portion of which is shown in FIG. 1, a receptacle 2 is designed in the form of a recess. The receptacle 2 can, however, also be designed in the form of a housing or box fastened to the vibration plate 1. In FIG. 1, common attachments and covers existing in vibrations plates as well as the electrical connections for a battery 3 are left out to simplify the representation.

A cage 4 made up of two cage halves 4a, 4b can be inserted into the receptacle 2.

The cage 4 can also be designed in the form of a box in one piece. However, the two-part design shown in the figures with cage halves 4a, 4b has the advantage in that the cage halves 4a, 4b can also be used with other equipment types with other batteries, in particular batteries with other design lengths, without having to change the cage halves 4a, 4b themselves, since their distance from one another is freely variable. Each of the cage halves 4a, 4b touches four sides of the battery 3 in the process.

The inside of the cage 4 or cage halves 4a, 4b is designed so that the battery 3 can be inserted into it.

The external dimensions of the cage 4 and the internal dimensions of the receptacle 2 are selected so that between the side walls of the receptacle 2 and the cage 4 a gap or intermediate space is designed between the side walls of the receptacle 2 and the cage 4, not shown in the figures. Moreover, by suitably selecting the installed height, it is also possible to provide a gap under the cage in which spring-damper elements 7, explained later, are kept.

In the especially suitable embodiment form shown in the figures, the cage halves 4a, 4b consist of a metal sheet that has bent side lobes 5 to produce the special structure. The side lobes 5 can also be welded on. Of course, many other favorable embodiment forms are conceivable that can be selected by an expert according to the available manufacturing methods, wherein even plastics can be used.

Spring-damper elements 7 are fastened to the outsides of the side lobes 5, which serve as a floor plate and as side walls, as well as at one front wall 6, that are located in the gap after placing the cage 4 into the receptacle 2 and which touch the corresponding insides of the receptacle 2 with their free front ends.

It is preferred that the spring-damper elements 7 be made of an elastic rubber material. However, other materials and structures frequently used by an expert are possible. In the figures, the spring-damper elements 7 are cylindrically designed. It can also be useful, depending on the application, to equip the spring-damper elements 7 with a cross section that varies along its height and, for example, to use conical or pyramid shaped elements.

It is preferred to fasten the spring-damper elements 7 to the bottom of a floor plate 8 as well as to all exterior sides of the side walls 5, 6 of the cage 4 in order to dampen acceleration loads that are exerted by the five side surfaces of the receptacle 2 as recognized in FIG. 1. The receptacle 2 is—as seen in FIG. 1—freely accessible from above. In other embodiment forms, however, the battery 3 is fastened down in the receptacle 2 by a cover.

For improved handling ability, there are two carrying grips 9 at the cage 4. The operator uses them to guide the two cage halves 4a, 4b together in the direction of the arrows A, B until the battery 3 is enclosed by the cage 4. Then, the operator drops the cage 4 together with the battery 3 in the direction of arrow C into the receptacle 2. Then, the electrical connections not shown are connected to the battery 3 in a known fashion.

The oscillation-insolating support according to the invention for a starter battery enables the use of common starter batteries without having to consider the damages which would otherwise arise during operation. The support is designed cost-effectively, enables easy assembly and can be retrofitted easily. In addition, the support can be used without design modifications for various types of equipment.

The spring-damper elements 7 are easily adjusted, allow long oscillation paths, allowing on the one hand the battery 3 to be held softly, and for which on the other hand a suitable dampening will prevent too strong of an amplitude resonation.

Since the cage 4 is not permanently connected to the vibration plate 1, but sits loosely in the receptacle 2, rapid exchange can be done easily.

In the embodiment form shown, the spring-damper elements 7 are attached to the exterior side of the cage 4. In other embodiment forms—not show—, the spring-damper elements 7 can be also placed loosely into the gap between the cage 4 and the receptacle 2. Again, in another embodiment form of the invention, not shown, the spring-damper elements 7 can also be fastened permanently to the walls of the receptacle 2. The cage 4 with the battery 3 is then placed loosely onto the spring-damper elements 7.

Figure 3:
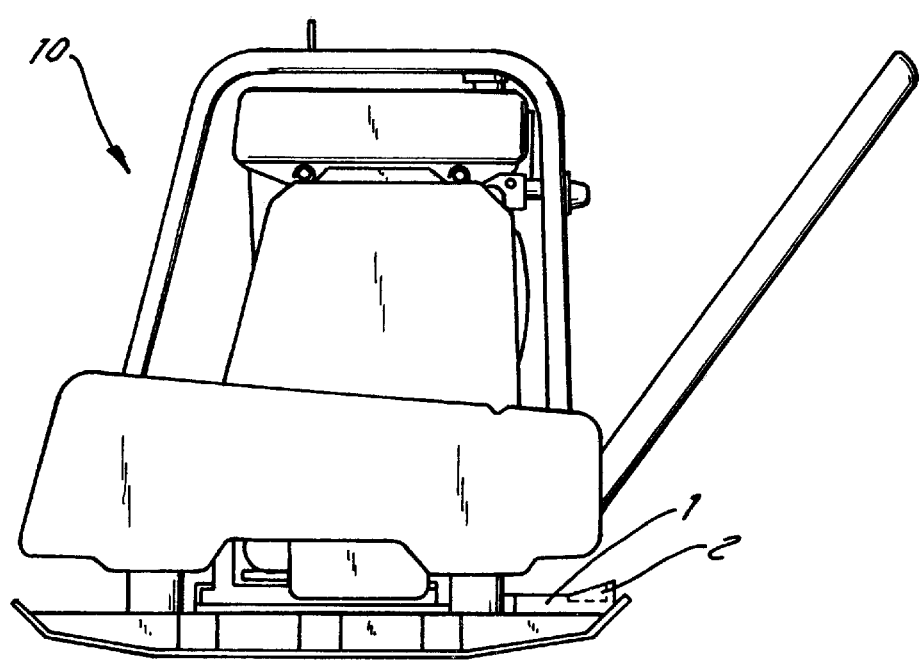
FIG. 3 an elevation view of a soil compaction device including the piece of equipment and the receptacle for receiving the cage and battery of FIG. 1.

Looking now at FIG. 3, a vibration plate 1 is disposed on a soil compaction device in the form of a vibrating tamper 10. By placing the battery 3 and the cage 4 within the receptacle 2 on the vibration plate 1, any vibrations transmitted from the soil compaction device 10 to the battery 3 through the vibration plate 1 are dampened by the spring-damper elements 7 disposed on the cage 4.

What is claimed is:

1. A soil compaction device comprising:
   a receptacle provided on a top side of the soil compaction device,
   a cage that can be placed into the receptacle to hold a battery,
   a gap designed between at least one external side of the cage and at least one inner side of the receptacle, and at least one spring-damper element that is located in the gap and that is disconnected from at least one of the receptacle and the cage.

2. A soil compaction device according to claim 1, wherein a number of spring-damper elements are fastened to at least one exterior side of the cage and not to the receptacle.

3. A soil compaction device according to claim 1, wherein the exterior sides of the cage include at least one floor plate and a number of side walls to each of which at least one spring-damper element is fastened.

4. A soil compaction device according to claim 1, wherein the spring-damper element is made of an elastic rubber material.

5. A soil compaction device according to one of claim 1, wherein the cage has at least two carrying grips.

6. A soil compaction device according to claim 1, wherein the cage is made of two separate halves between which the battery can be placed.

7. A soil compaction device according to claim 6, wherein each of the halves has a floor plate and three side walls to each of which at least one spring-damper element is fastened.

8. A soil compaction device according to claim 3, wherein the cage is made of two separate halves between which the battery can be placed.

9. A soil compaction device according to claim 8, wherein each of the halves has a floor plate and three side walls to each of which at least one spring-damper element is fastened.

10. A soil compaction device comprising:

a receptacle provided on a top side of the soil compaction device, a cage that can be placed into the receptacle to hold a battery, a gap designed between at least one external side of the cage and at least one inner side of the receptacle, and at least one spring-damper element that is located in the gap and that is disconnected from both the receptacle and the cage.

* * * * *